Oct. 14, 1958 S. ZEITLIN 2,855,867
AUTOMATIC TURNOVER MACHINES
Filed Sept. 10, 1956 4 Sheets-Sheet 3
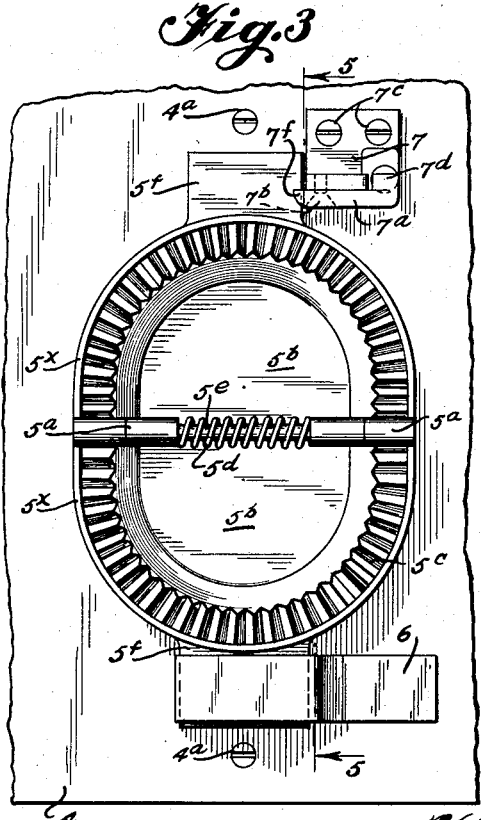
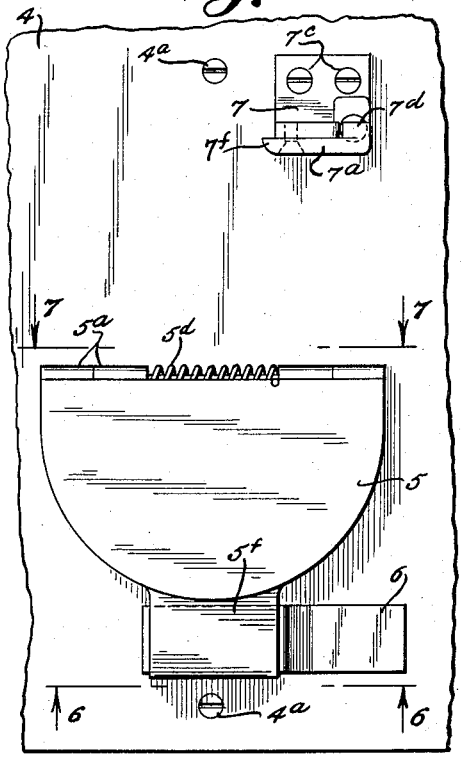
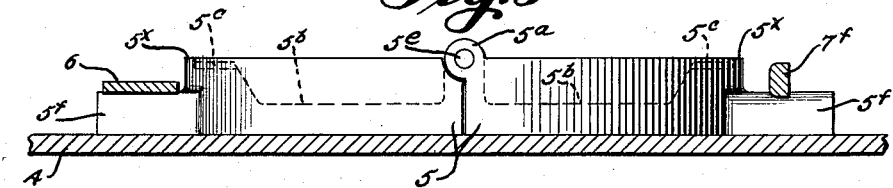
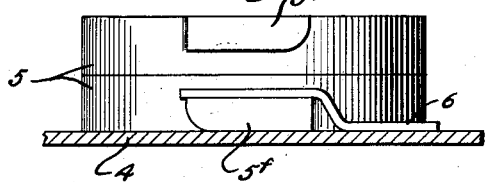
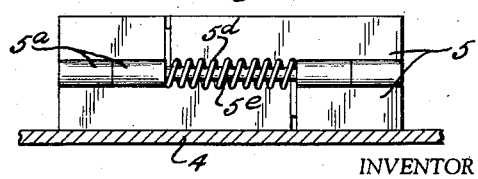
INVENTOR
Sam Zeitlin
BY Alexander & Dowell
ATTORNEYS Oct. 14, 1958
S. ZEITLIN
2,855,867
AUTOMATIC TURNOVER MACHINES
Filed Sept. 10, 1956
4 Sheets-Sheet 4
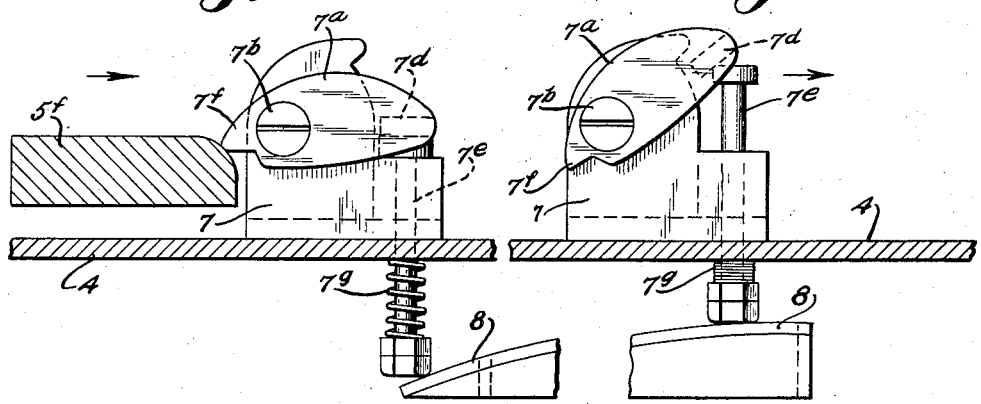
INVENTOR
Sam Zeitlin
BY Alexander & Dowell
ATTORNEYS United States Patent Office 2,855,867
Patented Oct. 14, 1958

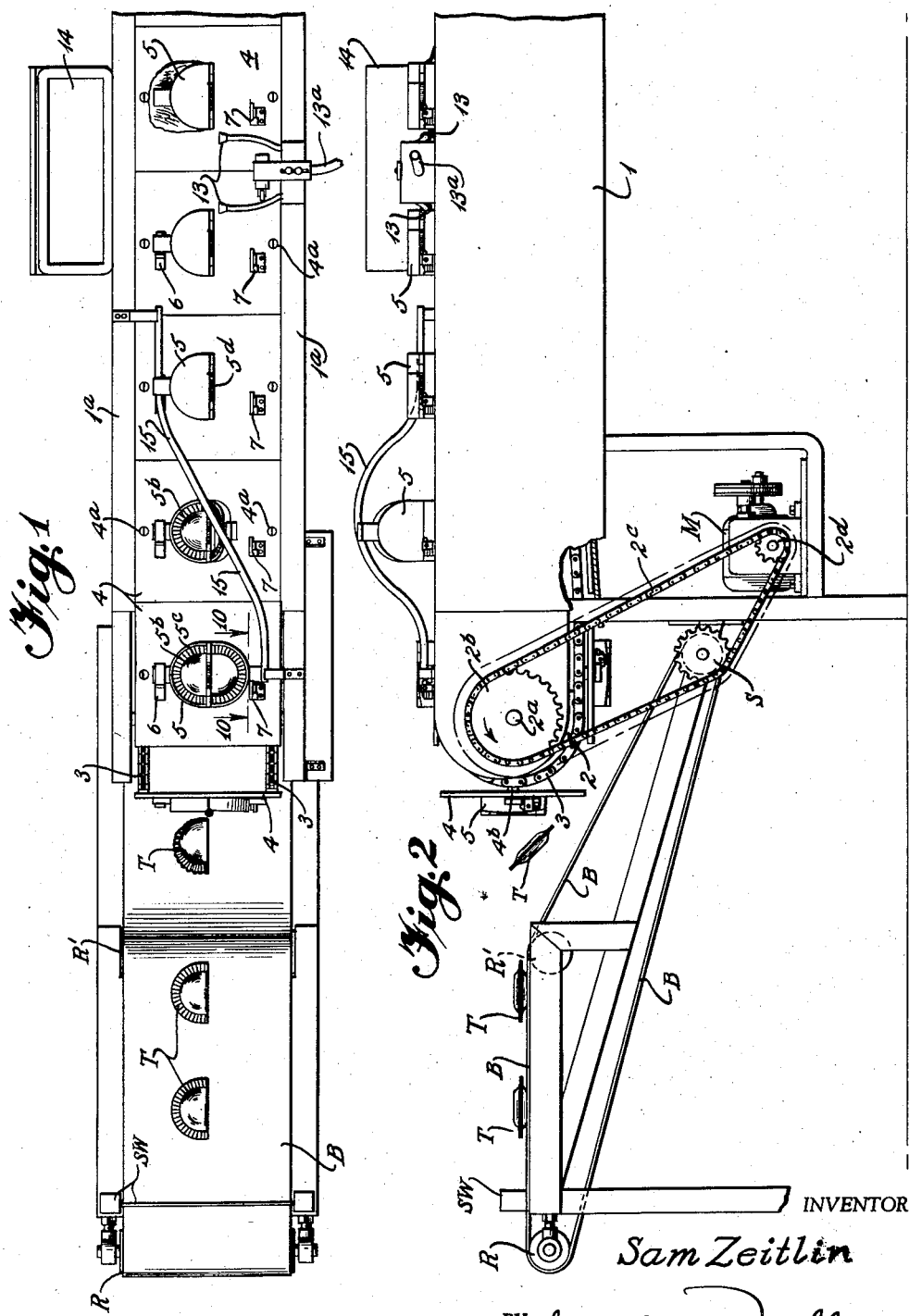

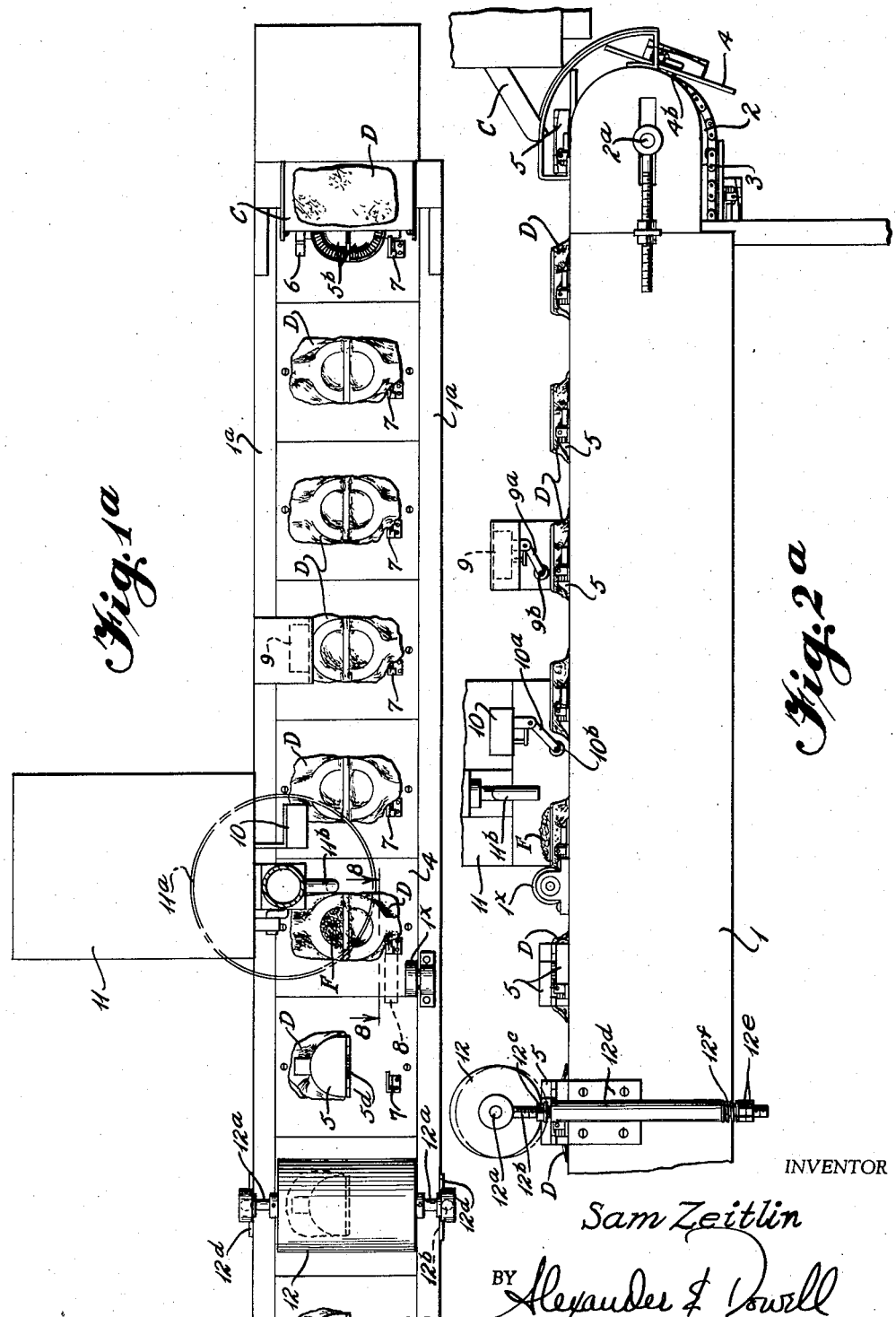

2,855,867

AUTOMATIC TURNOVER MACHINES

Sam Zeitlin, Santa Monica, Calif.

Application September 10, 1956, Serial No. 608,986

20 Claims. (Cl. 107—1)

My invention relates to production machinery for continuously and automatically forming pastries; and more particularly relates to automatic machinery for making turnovers and similar products.

The principal object of my invention is to provide in combination with an automatic machine a series of moving dies for forming turnovers from sheets of rolled dough laid over the open dies and filled with a material which is poured thereon, each die then being snapped shut so suddenly that the dough in the sheets is folded neatly over the filling without distortion or slumping.

It is another object to provide an automatic machine wherein excess dough is trimmed off and disposed of after each die closes, the dies each being automatically reopened to drop the formed turnover on to a conveyor belt whence it passes to a cooking oven, the conveyor belt and oven forming no part of the present invention.

A further object is the provision of an automatic machine wherein turnovers are being continuously formed and wherein the finished product so formed is uniform.

Still another object is to provide a machine wherein the dies are quickly and easily removed and installed to facilitate washing thereof or replacement by different sizes and/or shapes of dies.

It is another object to provide a machine to be used in forming turnovers of attractive appearance, the turnovers including a serrated semi-peripheral edge where the folded sheet of dough is sealed on itself.

Yet another object is the provision of a machine in which the dies follow a closed path around a conveyor and are automatically passed through a cycle beginning with the die open and covered with a sheet of rolled dough, and ending with the die being reopened and a formed turnover dropped out.

Other objects and adavantages of my invention will become apparent in the following discussion of the drawings, wherein:

Figures 1 and 1a are each partial plan views of a machine which embodies the invention, the two figures when joined together forming a continuous plan view.

Figures 2 and 2a are each partial front elevational views of the machine, which figures when joined together form a continuous elevational view.

Figure 3 is an enlarged plan view of one of my novel forming dies, showing the latter opened and held in engagement with a plate mounted on the conveyor of the machine.

Fig. 4 is a view corresponding with Fig. 3 but showing the forming die in closed position.

Fig. 5 is a cross sectional view along line 5—5 of Fig. 3.

Fig. 6 is a cross sectional view taken along line 6—6 of Fig. 4.

Fig. 7 is a cross sectional view taken along line 7—7 of Fig. 4.

Fig. 8 is an enlarged partial sectional view taken along line 8—8 of Fig. 1a and showing the latch in die-open position.

Fig. 9 is a view corresponding with Fig. 8 but showing the latch in die-released position.

Fig. 10 is an enlarged view along line 10—10 of Fig. 1, another position of the latch being shown in dashed lines.

Fig. 11 is a view similar to Fig. 10 but showing the position of the latch at a slightly later interval of time. The solid-line position in Fig. 10, then the dashed position in Fig. 10, then the solid-line position in Fig. 11, and finally the dashed-line position in Fig. 11 sequentially show four consecutive positions occupied by the mechanism during the transition of the die from an opening position to a position wherein it is latched open.

Referring to the drawings, Figs. 1, 1a, 2 and 2a show plan and elevational views of the machine which illustrate its overall structure. The machine itself has a frame (not shown) which is covered by a set of side plates 1 having flanges 1a which overlie the top edges of the machine. A pair of sprocket wheels 2 are mounted in the frame at each end of the machine, as shown in Fig. 2. These sprocket wheels are located within the side plates 1 and carry a pair of conveyor chains 3 which travel longitudinally of the upper surface of the machine in a leftward direction. The leftmost sprocket 2 is mounted on a shaft 2a which in turn carries another sprocket 2b located in such a position as to be driven by a chain 2c which operates from a gear-box 2d driven by a motor M. The chain 2c may also be employed to drive a small belt conveyor comprising a sprocket S and a belt B which passes over rollers R and R'. A switch means SW is located at the leftmost end of the upper run of the belt B and serves the purpose hereinafter described.

The conveyor-belt B assembly forms no part of the present invention and is merely illustrated as one means of catching the finished product when it is dropped out of the forming die, as will presently be explained.

Getting back to the forming machine itself, the two conveyor chains 3, which travel within the side plates 1, carry a plurality of identical conveyor plates 4, the plates 4 being fixed on each side to the respective chains 3 in any well-known manner. The conveyor plates 4 travel in a leftward direction along with the chains 3, when power is supplied to the sprockets 2, through the drive chain 2c from the motor M.

The screws 4a are used to maintain the plate 4 connected with the chain 3, and a spacer 4b is also provided on each side to give the plate 4 a proper clearance with respect to the side portion flanges 1a. In view of the fact that conveyors of the type employed herein having chain elements which support individual plates 4 are common, no particular discussion of the exact details thereof has been included in this patent application.

As may best be seen in Figs. 3, 4, 5, 6 and 7, each conveyor plate 4 carries a hinged die which constitutes two semi-circular die sections 5 joined together by a hinge 5a, and each die section having an internal recess 5b surrounded by a semi-peripheral serrated lip 5c for fluting the pastry edge. The hinge 5a includes a strong spring 5d which surrounds the hinge pin 5e and continuously urges the die sections to snap shut and mate in the position shown in Figs. 4, 6 and 7.

As shown in Figs. 3 and 6, each of the die sections 5 has an extending lug 5f, the lowermost lug in Fig. 3 being held against the plate 4 by a strap 6 which may be welded or otherwise secured to the conveyor plate 4, and the uppermost lug 5f in Fig. 3 being held down on the conveyor plate 4 by means of a latch assembly 7 which may be most clearly seen in Figs. 8, 9, 10 and 11.

Each latch assembly 7 includes a dog 7a which is pivotally connected to the body of the latch assembly by a screw 7b. The body of the latch assembly 7 is secured by any convenient means to the conveyor plate and in this case is illustrated as secured thereto by means of screws 7c. Each of the dog members 7a has a transverse extension 7d which overlies the head of a push rod 7e so that when the push rod is urged upwardly, the dog pivots counter-clockwise around the screw 7b so as to lower the pawl 7f at the left end of the latch, as shown in Fig. 8. This lowering action releases the uppermost lug 5f and permits the spring 5d to pivot the upper die section 5 about the hinge pin 5e and snap the die shut against the lowermost die section 5 to the position shown in Figs. 4, 6 and 7. The lower end of the push rod 7e is actuated as shown in Figs. 8 and 9 by a cam 8, shown in Figs. 1a, 8 and 9, and secured to the frame of the machine between the side plates 1 and beneath the upper run of the conveyor chain 3. It will also be observed that the push rod 7e is provided with a spring 7g to insure that it always returns to its lowermost position, as shown in Fig. 8, when not engaging a cam 8. As shown in Figs. 1a and 2a, a roller 1x is mounted on the flanged portion 1a on the sides of the machine so as to provide a downward force against the upper surface of the conveyor plate when the push rod 7e begins to ride up on the cam 8. Without the roller 1x, the effect of the push rod 7e contacting the cam 8 might be to raise the plate 4 off of the conveyor rather than to actuate the dog 7a so as to release the lug 5f and permit the upper die section to snap shut against the lower die section. Each of the conveyor plates 4 is equipped with a die 5, a strap 6 and a latch mechanism 7, so that all of the plates 4 on the machine are substantially identically equipped.

Returning to Figs. 1, 1a, 2 and 2a, it will be seen that at the extreme right end of the machine the conveyor plate 4 is rising, whereas at the extreme left end of the machine the conveyor plate 4 is descending. At the right end of the machine may be located an automatic device for placing a sheet of rolled dough D over the top of each of the open dies as they pass beneath a chute C. Alternatively, of course, the sheets of dough D may be placed over the open die sections 5 manually.

Each die then proceeds in a leftward direction, Figs. 1a and 2a, until the die passes beneath a switch 9 actuated by a small lever arm 9a which carries a roller 9b at its outer end. This switch, in the position shown in Fig. 2a, is normally "on" but in the event that a die should pass thereunder which is in closed position (as shown in Fig. 4) the closed die would then raise the roller 9b and associated lever arm 9a to move the switch 9 to an "off" position so as to turn off the motor M and stop the motion of the machine. This is a safety feature provided to prevent a die which is accidentally closed from passing into subsequent mechanism and causing damage thereto.

As a particular die 5 moves leftwardly along the machine beyond the switch assembly 9 it next encounters a switch assembly 10 having a lever arm 10a and a roller 10b. It is to be noted that the roller 10b is in a lower position than the preceding roller 9b so as to contact each strap 6 and/or associated lug 5f. The switch 10, as shown in Fig. 2a, is normally in an "off" position but is turned "on" when the roller 10b contacts a strap 6. The switch 10 is connected to the operating mechanism of a filling dispenser which will be generally represented by the box marked with the reference numeral 11. At the end of the box adjacent the machine, there is located an electric dispensing mechanism (not shown) which takes filling from a hopper 11a and dispenses a metered quantity thereof through the spout 11b, the filling F dropping onto the sheet of dough which overlies the die 5, and the filling F occupying only one side of the die sections 5, namely the side which is adjacent to the strap 6. The mechanism by which the filling dispenser operates is not important to the present invention and therefore no detail of that particular machine is shown.

Just after the die has passed under the filling nozzle 11b and has been filled, the latch mechanism approaches the cam 8 which is located beneath the conveyor plates 4 and is attached to the frame of the machine. At this time the dog 7a is in the position shown in Fig. 8 and the lug 5f is latched under the pawl 7f (as shown in Fig. 8). Upon further leftward travel of the conveyor and associated die sections 5, the lower end of the push rod 7e engages the cam 8 and is moved upwardly so as to rotate the dog 7a in a counter-clockwise direction which permits the lugs 5f to slide out from beneath the pawl 7f, and thereby permit the die to be suddenly snapped shut by the spring 5d. The closed die 5 then passes beneath a roller 12, which roller is free to rotate around the shaft 12a which is in turn supported by several vertically disposed rods 12b, each of which has a stop nut 12c near its upper end so as to limit downward travel of the rods 12b in the brackets 12d through which they pass. Each of the brackets 12d is secured to a side plate 1 of the machine and the rods 12b are long enough to extend below the lower ends of the brackets 12d. Stop nuts 12e are provided at the lower end of each rod and a coil spring 12f is compressed between the lower end of the bracket 12d and each stop nut 12e so as to urge the roller 12 downwardly against the upper surface of the die 5. As the die 5 passes beneath the roller it actually raises the roller somewhat, see the dashed lines in Fig. 2a, thereby causing further compression of the springs 2f which transmit pressure through the roller to the uppermost die section 5a so as to press the die tightly closed and thereby insure that the sheet of dough D is tightly sealed around the serrated peripheral portion 5c of the die. The pressure of the roller 12 downwardly against the top of the die 5 also has the effect of cutting off excess dough by squeezing it off between the two die-section edges 5x—5x, as shown in Figs. 3 and 5.

Referring now to Figs. 1 and 2, the compressed die 5 then passes between a pair of air nozzles 13—13 and a container 14. Compressed air is supplied to the nozzles 13 via hose 13a from a compressor (not shown) which forms no part of the present invention. As soon as the excess dough has been cut by roller pressure on the die, the die surrounded by the excess dough D passes between the nozzles 13 and the container 14 and the dough is blown into the container 14, from which it may be manually removed. After the die has passed beyond the nozzles 13 it then approaches the overhead cam 15, which overhead cam is so disposed that it passes between the upper and lower lugs 5f of the die sections thereby underrunning the uppermost lug and raising it to open the die and finally relatch the uppermost die section in the position shown in Figs. 10 and 11. At this time the die has been once more opened to the position in which it began the run along the top of the machine, and the turnover T is merely lying in one section of the die and held there by gravity.

By reference to Figs. 10 and 11 it will be seen that the overhead cam 15 carries the lug 5f into the position first illustrated in solid lines in Fig. 10, then in dashed lines in Fig. 10, then in solid lines in Fig. 11, and finally in dashed lines in Fig. 11, at which time the pawl 7f of the dog 7a is once again maintaining the lug 5f in close proximity with the conveyor plate 4. In this position the die is once again latched open. The die plate then passes beyond the end of the machine and begins its downward descent, as shown just to the left of center in Figs. 1 and 2. At this time the turnover T drops out of the machine and is deposited on the belt B of the conveyor whence it is carried off, presumably to a baking oven (not shown). An operator would normally be present to remove the formed turnovers T from the belt B, but the switch SW is provided to overlie the upper run of the belt B so that in the event that the operator fails to remove the formed turnover T from the belt B the switch SW will turn off the entire mechanism until the reason for the omission is determined.

I do not limit my invention to the exact form shown in the drawings for obviously changes may be made therein within the scope of the claims.

I claim:

1. In a forming machine for making pastry using rolled dough sheets and a prepared filling, and said machine having a continuous conveyor, forming means comprising a plurality of forming dies spaced along said conveyor, each die including two mating sections hinged together and secured to the conveyor; spring means operative between the sections of each die and urging the sections together; latch means for holding the sections of each die open; trip means on the machine and operative with said latch means to release the latter after the associated open die has received the dough sheet and filling; and die opening means to open and re-latch the dies to permit removal of the formed pastry.

2. In a machine as set forth in claim 1, said die sections each having a recessed cavity partly surrounded by a serrated surface located within a coextensive dough cutting edge; a hinge joining the sections together opposite the serrated surface; and said spring means comprising a spring in said hinge and urging the die sections to close thereabout.

3. In a machine as set forth in claim 1, each die section having a lug extending outwardly in a direction normal to the axis of the hinge, and said conveyor having a hold-down means associated with each latch means, the dies being held in open position by the hold-down means engaging the lug of one die section and by the latch means engaging the lug of the other die section.

4. In a machine as set forth in claim 3, the lug which normally engages said latch means when the die sections are open, overlying the lug which engages the hold-down means when the die sections are closed, and said die opening means comprising a cam bar fixed to the machine and arched diagonally across the conveyor and disposed to enter between said lugs and raise the first mentioned lug away from the hold-down lug and relatch the former by said latch means with the die sections again in open position.

5. In a machine as set forth in claim 1, said latch means comprising a pivotally supported arm fixed to the conveyor and having a pawl at one end, said pawl extending over the die section and latching it down on the conveyor; and said trip means comprising a rod connected with the conveyor and extending toward a cam attached to the machine, the rod being brought into contact with the cam by the motion of the conveyor therepast and actuating the arm to pivot the pawl out of conact wih the die section.

6. An automatic forming machine for use in making pastry from dough sheets and pastry filling delivered to the machine at a dispensing station, comprising an elongated frame; a continuous conveyor in the frame in proximity to the dispensing station; a plurality of forming dies each including two mutually-hinged mating die sections, and said dies being fixed on said conveyor in mutually spaced relation; spring means connected between said hinged sections and yieldably biasing said sections to close in mated relation; latch means on the conveyor associated with each die for holding the dies open while passing said dispensing station whereat a dough sheet is placed over each open die as it passes a point near one end of the conveyor and filling is deposited on each dough sheet; and a trip on the frame beyond the dispensing station for tripping the latch means and releasing the die sections to mate and form the pastry.

7. In a machine as set forth in claim 6, said die sections each having a recessed cavity partly surrounded by a serrated surface located within a coextensive dough cutting edge; a hinge joining the sections together opposite the serrated surface; and said spring means comprising a spring in said hinge and urging the die sections to close thereabout.

8. In a machine as set forth in claim 6, each die section having a lug extending outwardly in a direction normal to the axis of the hinge, and said conveyor having a hold-down means associated with each latch means, the dies being held in open position by the hold-down means engaging the lug of one die section and by the latch means engaging the lug of the other die section.

9. In a machine as set forth in claim 8, said latch means comprising a pivotally supported arm fixed to the conveyor and having a pawl at one end, said pawl extending over the die section and latching it down on the conveyor; and said trip means comprising a rod connected with the conveyor and extending toward a cam attached to the machine, the rod being brought into contact with the cam by the motion of the conveyor therepast and actuating the arm to pivot the pawl out of contact with the die section.

10. An automatic forming machine for use in making pastry from dough sheets and pastry filling delivered to the machine at a dispensing station, comprising an elongated frame; a continuous conveyor in the frame in proximity to the dispensing station; a plurality of forming dies each including two mutually-hinged mating die sections, and said dies being fixed on said conveyor in mutually spaced relation; spring means connected between said hinged sections and yieldably biasing said sections to close in mated relation; latch means on the conveyor associated with each die for holding the dies open while passing said dispensing station whereat a dough sheet is placed over each open die as it passes a point near one end of the conveyor and filling is deposited on each dough sheet; a trip on the frame beyond the dispensing station for tripping the latch means and releasing the die sections to mate and form the pastry; and die opening means on the frame for forcibly opening the dies at the other end of the frame to relatch the die open and permit removal of the formed pastry.

11. In a machine as set forth in claim 10, said die sections each having a recessed cavity partly surrounded by a serrated surface located within a coextensive dough cutting edge; a hinge joining the sections together opposite the serrated surface; and said spring means comprising a spring in said hinge and urging the die sections to close thereabout.

12. In a machine as set forth in claim 10, each die section having a lug extending outwardly in a direction normal to the axis of the hinge, and said conveyor having a hold-down means associated with each latch means, the dies being held in open position by the hold-down means engaging the lug of one die section and by the latch means engaging the lug of the other die section.

13. In a machine as set forth in claim 12, the lug which normally engages said latch means when the die sections are open, overlying the lug which engages the hold-down means when the die sections are closed, and said die opening means comprising a cam bar fixed to the machine and arched diagonally across the conveyor and disposed to enter between said lugs and raise the first mentioned lug away from the hold-down lug and relatch the former by said latch means with the die sections again in open position.

14. In a machine as set forth in claim 10, said latch means comprising a pivotally supported arm fixed to the conveyor and having a pawl at one end, said pawl extending over the die section and latching it down on the conveyor; and said trip means comprising a rod connected with the conveyor and extending toward a cam attached to the machine, the rod being brought into contact with the cam by the motion of the conveyor therepast and actuating the arm to pivot the pawl out of contact with the die section.

15. An automatic forming machine for use in making pastry from dough sheets and pastry filling delivered to the machine at a dispensing station, comprising an elongated frame; a power driven continuous conveyor in the frame in proximity to the dispensing station; a plurality of forming dies each including two mutually-hinged mating die sections, and said dies being fixed on said conveyor in mutually spaced relation; spring means connected between said hinged sections and yieldably biasing said sections to close in mated relation; latch means on the conveyor associated with each die for holding the dies open while passing said dispensing station whereat a dough sheet is placed over each open die as it passes a point near one end of the conveyor and a quantity of filling is deposited on each dough sheet; a trip on the frame beyond the dispensing station for tripping the latch means and releasing the die sections to mate and form the pastry; press means beyond said trip for pressing the die sections together to cut off excess dough around the periphery of the die; means for removing the excess dough from the conveyor; and die opening means on the frame for forcibly opening the dies at the other end of the frame to re-latch the die open and permit removal of the formed pastry.

16. In a machine as set forth in claim 15, each die section having a lug extending outwardly in a direction normal to the axis of the hinge, and said conveyor having a hold-down means associated with each latch means, the dies being held in open position by the hold-down means engaging the lug of one die section and by the latch means engaging the lug of the other die section.

17. In a machine as set forth in claim 16, the lug which normally engages said latch means when the die sections are open, overlying the lug which engages the hold-down means when the die sections are closed, and said die opening means comprising a cam bar fixed to the machine and arched diagonally across the conveyor and disposed to enter between said lugs and raise the first mentioned lug away from the hold-down lug and relatch the former by said latch means with the die sections again in open position.

18. In a machine as set forth in claim 16, the die section associated with said hold-down means being below the other mating die section when the sections are in closed position, and said press means comprising a roller disposed above the conveyor and urged downwardly against said other mating die section as it passes thereunder; and said means for removing the excess dough comprising nozzle means connected with a source of fluid pressure, the nozzle means emitting a jet directed across the conveyor.

19. In a machine as set forth in claim 15, said latch means comprising a pivotally supported arm fixed to the conveyor and having a pawl at one end, said pawl extending over the die section and latching it down on the conveyor; and said trip means comprising a rod connected with the conveyor and extending toward a cam attached to the machine, the rod being brought into contact with the cam by the motion of the conveyor therepast and actuating the arm to pivot the pawl out of contact with the die section.

20. A pastry forming die including two die sections mutually hinged together and each having a narrow peripheral edge, which edges mate into mutual contact to cut off excess pastry when the dies are brought together, the die sections each being recessed to form the die cavity and the portion of each die section lying between the recessed portion and the mating edge including a serrated surface for fluting the edge of the pastry, said serrated surfaces being mutually spaced when the die sections are mated; and spring means operatively connected between said sections yieldably biasing them to close into mated relation.

References Cited in the file of this patent

UNITED STATES PATENTS

| | | |
|---|---|---|
| 1,236,998 | Tommasini | Aug. 14, 1917 |
| 1,596,652 | Giovannetti | Aug. 17, 1926 |
| 2,021,597 | Frost | Nov. 19, 1935 |
| 2,138,247 | Tatosian | Nov. 29, 1938 |
| 2,158,910 | Pellar | May 16, 1939 |
| 2,160,783 | McDonald | May 30, 1939 |
| 2,494,236 | Goldstein | Jan. 10, 1950 |
| 2,588,454 | Abel et al. | Mar. 11, 1952 |
| 2,747,521 | Gardner | May 29, 1956 |